US011908366B2

(12) United States Patent
Zhang

(10) Patent No.: US 11,908,366 B2
(45) Date of Patent: Feb. 20, 2024

(54) CROSS VOLTAGE COMPENSATION METHOD FOR DISPLAY PANEL, DISPLAY PANEL AND DISPLAY DEVICE

(71) Applicant: HKC CORPORATION LIMITED, Shenzhen (CN)

(72) Inventor: Liang Zhang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/118,733

(22) Filed: Mar. 7, 2023

(65) Prior Publication Data

US 2023/0222952 A1 Jul. 13, 2023

Related U.S. Application Data

(62) Division of application No. 17/040,978, filed on Sep. 24, 2020, now Pat. No. 11,626,051.

(51) Int. Cl.
*G09G 3/20* (2006.01)

(52) U.S. Cl.
CPC ......... *G09G 3/20* (2013.01); *G09G 2310/062* (2013.01); *G09G 2320/0209* (2013.01)

(58) Field of Classification Search
CPC ............... G09G 3/20; G09G 2310/062; G09G 2310/0254–0256; G09G 2320/0209
See application file for complete search history.

(56) References Cited

U.S. PATENT DOCUMENTS 5,742,269 A * 4/1998 Hayashiguchi ...... G09G 3/3611 345/94
5,892,493 A * 4/1999 Enami .................. G09G 3/3688 345/94
2004/0239602 A1* 12/2004 Kim ..................... G09G 3/3611 345/87
2009/0109157 A1* 4/2009 Li ........................ G09G 3/3659 345/92
2019/0333456 A1* 10/2019 Lim ......................... G09G 3/36
2020/0074939 A1* 3/2020 Kim ..................... G09G 3/3233
2020/0152128 A1* 5/2020 Kim ..................... G09G 3/3266
2021/0157608 A1* 5/2021 Yu ......................... G06F 9/4411

* cited by examiner

*Primary Examiner* — Stephen G Sherman

(57) ABSTRACT

The present application discloses a cross voltage compensation method for a display panel, a display panel and a display device. The cross voltage compensation method includes steps of transmitting a preset voltage signal to in-plane data lines after scan of scanning lines of a last row of a current frame is completed and before scanning lines of a first row of a next frame are started, keeping all the scanning lines at a close state while transmitting the preset voltage signal to in-plane data lines, and keeping all the scanning lines at a close state after scan of scanning lines of a last row of a current frame is completed and before scanning lines of a first row of a next frame are started, that is, V-blank time.

6 Claims, 3 Drawing Sheets

CROSS VOLTAGE COMPENSATION METHOD FOR DISPLAY PANEL, DISPLAY PANEL AND DISPLAY DEVICE

CROSS REFERENCE OF RELATED APPLICATIONS

This application is a divisional application of U.S. patent application Ser. No. 17/040,978 filed Sep. 24, 2020, which is hereby incorporated by reference herein in its entirety.

TECHNICAL FIELD

The present application relates to the technical field of display, particularly to a cross voltage compensation method for a display panel, a display panel and a display device.

BACKGROUND ART

With the development and advancement of science and technology, flat-panel displays (FPD) are widely applied due to its advantages in thin body, low power consumption, no radiation, and on the like. The flat-panel displays include thin film transistor-liquid crystal displays (TFT-LCD) and an organic light-emitting diode (OLED) displays, and on the like. Where the TFT-LCD refracts light of a backlight module to produce an image by controlling a rotation direction of liquid crystal molecules, and has advantages in thin body, low power consumption, no radiation, and on the like. And the OLED display is made of organic electroluminescent diodes, and has advantages in self-luminous, short response time, high definition and contrast, and capacity in flexible display and full-color display of a large area, and on the like.

In order to prevent polarization of liquid crystal, a panel driver adopts an alternating current (AC) driving method. However, this method often causes pixels to be insufficiently charged, and thereby leads the display to be relatively dark. Thus, in order to solve a problem in insufficient charge, a voltage compensation method is adopted here to ensure a normal display.

SUMMARY

The present application provides a cross voltage compensation method for a display panel, a display panel, and a display device, where voltages on in-plane transmission lines are changed to a same polarity in advance in the cross voltage compensation method to ensure a charging effect of a first row of a next frame.

In order to achieve the forgoing object, the present application provides a cross voltage compensation method for a display panel, including steps of: transmitting a preset voltage signal to in-plane data lines after scan of scanning lines of a last row of a current frame is completed and before scanning lines of a first row of a next frame are started; and keeping all the scanning lines at a close state while transmitting the preset voltage signal to the in-plane data lines.

Optionally, the step of transmitting a preset voltage signal to in-plane data lines includes acquiring a preset voltage signal having a same polarity as the data signals of the first row of the next frame, and transmitting the preset voltage signal to the in-plane data lines.

Optionally, a polarity of data signals of the last row of the current frame is opposite to polarity of data signals of the first row of the next frame; and the step of acquiring a preset voltage signal having a same polarity as data signals of a first row of a next frame includes: detecting and basing a polarity of data signals of the last row of the current frame to acquire a preset voltage signal having a polarity opposite to polarity of data signals of the last row of the current frame.

Optionally, the step of acquiring a preset voltage signal having a same polarity as data signals of a first row of a next frame includes: acquiring data signals of the first row of the next frame from a timing controller IC (TCON IC) after scan of scanning lines of the last row of the current frame is completed and before scanning lines of the first row of the next frame are started; and detecting and basing a polarity of data signals of the first row of the next frame to acquire a preset voltage signal having a same polarity as data signals of the first row of the next frame.

Optionally, the step of acquiring a preset voltage signal having a same polarity as data signals of a first row of a next frame includes: acquiring data signals of the first row of the next frame from a timing controller IC (TCON IC) after scan of scanning lines of the last row of the current frame is completed and before scanning lines of the first row of the next frame are started; and detecting and basing data signals of the first row of the next frame to acquire a preset voltage signal having same polarity data with data signals of the first row of the next frame.

Optionally, a polarity of data signals of the last row of the current frame is opposite to polarity of data signals of the first row of the next frame; and a voltage of the preset voltage signal is zero volts in the step of transmitting a preset voltage signal to in-plane data lines.

Optionally, the step of detecting and basing a polarity of data signals of a last row of the current frame includes: a counter beginning to count a scanning row number when the timing controller IC (TCON IC) detects that a polarity inversion signal for a source driver is switched to the current frame; and detecting and serving a polarity of data signals of a current scanning row as a polarity of data signals of the last row when a current scanning row number is equal to a preset maximum row number.

The present application further provides a display panel, including: a timing controller IC (TCON IC), controlling a gate driver circuit and a source driver circuit; a pre-compensation circuit, outputting a preset voltage signal; a default memory, storing the preset voltage signal; and a data driver chip, transmitting data signals to data lines within a display panel; wherein after scan of a last row of a current frame is completed and before scan of a first row of a next frame is started, the timing controller IC (TCON IC) inputs the preset voltage signal to data lines within the display panel while keeping the gate driver circuit closed.

Optionally, the pre-compensation circuit includes an advance acquirer including a microcontroller unit and a row counter, wherein the microcontroller unit and the row counter are both disposed on the timing controller IC, and the advance acquirer acquires data signals of the first row of the next frame from the timing controller IC.

The present application further discloses a display device that includes a display panel described above.

When the voltage difference between voltages of data signals of the last row of the current frame and voltages of data signals of the first row of the next frame is large, and even when the polarities thereof are opposite, data voltage of the data signals will fail to quickly reach a preset data voltage at the initial stage of scanning the first row of the next frame, which may lead to an insufficient charging rate at the initial stage of the scanning, and thereby causes occurrences of problems that the final charging voltage is insufficient and the first row of the next frame is not bright enough. In this solution, all the scanning lines are kept at a close state after scan of scanning lines of the last row of the current frame is completed and before scanning lines of the first row of the next frame are started, that is, V-blank time. And during the V-black time, the preset voltage signal is transmitted to the in-plane data lines to change the voltage therein in advance, so that in the period of scanning the last row of the current frame and the first row of the next frame, it is possible to reduce or even avoid the problem that the cross voltage of the data lines during the time of scanning the two rows of scanning lines is too large, which thereby solves the cross-voltage problem between the last row of the current frame and the first row of the next frame, especially the problem of insufficient charging caused by cross-voltage switching of different polarities.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

Figure 1:
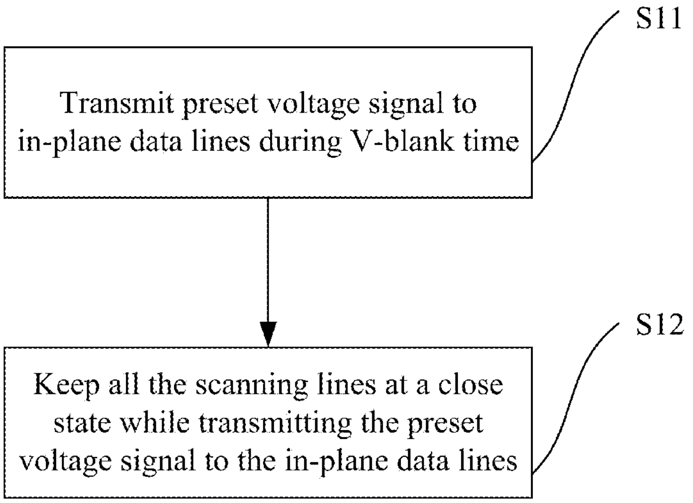
FIG. 1 is a schematic diagram of a cross voltage compensation method according to an embodiment of the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying relative importance, or implicitly indicating the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or coupled; or directly connected or indirectly connected through an intermediate medium, or in an internal communication between two elements. The specific meanings about the foregoing terms in the present application may be understood by those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

The present invention will be further described in detail below with reference to the accompanying drawings and optional embodiments.

Figure 2:
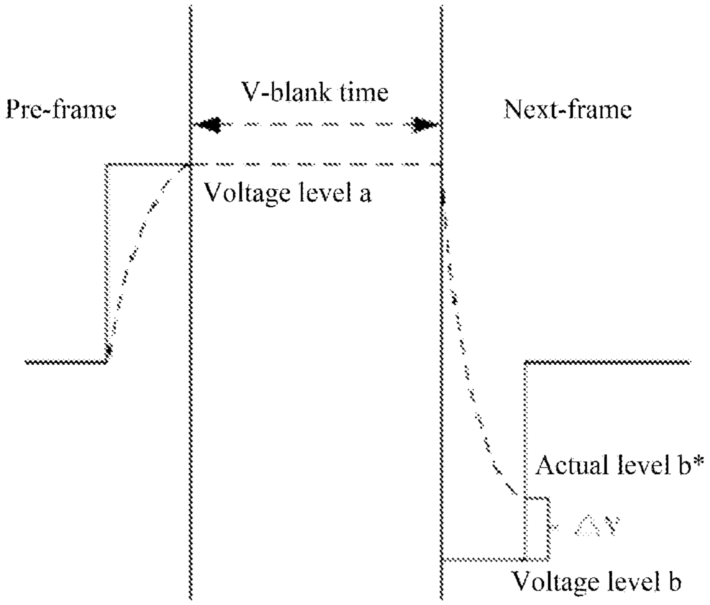
FIG. 2 is a schematic diagram of switching between preceding and later frames according to an embodiment of the present application.
Figure 3:
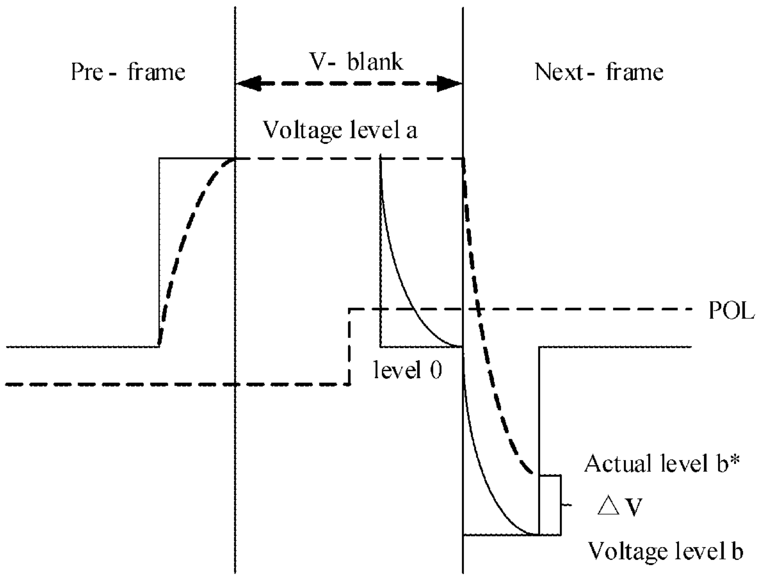
FIG. 3 is a schematic diagram of polarity inversion during V-blank time according to an embodiment of the present application.

As shown from FIG. 1 to FIG. 3, an embodiment of the present application discloses a cross voltage compensation method for a display panel 100, including steps of: S11: transmit a preset voltage signal to in-plane data lines after scan of scanning lines of the last row of the current frame is completed and before scanning lines of the first row of the next frame are started. S12: keep all the scanning lines at a close state while transmitting the preset voltage signal to the in-plane data lines.

In this solution, if the voltage difference between voltages of data signals of the last row of the current frame and voltages of data signals of the first row of the next frame is large, and even when the polarities thereof are opposite, data voltage of the data signals will fail to quickly reach a preset data voltage at the initial stage of scanning the first row of the next frame, which may lead to an insufficient charging rate at the initial stage of the scanning, and thereby causes occurrences of problems that the final charging voltage is insufficient and the first row of the next frame is not bright enough. In this solution, all the scanning lines are kept at a close state after scan of scanning lines of the last row of the current frame is completed and before scanning lines of the first row of the next frame are started, that is, V-blank time. And during the V-black time, the preset voltage signal is transmitted to the in-plane data lines to change the voltage therein in advance, so that in the period of scanning the last row of the current frame and the first row of the next frame, it is possible to reduce or even avoid the problem that the cross voltage of the data lines during the time of scanning the two rows of scanning lines is too large, which thereby solves the cross-voltage problem between the last row of the current frame and the first row of the next frame, especially the problem of insufficient charging caused by cross-voltage switching of different polarities.

In an embodiment, the step of transmitting a preset voltage signal to in-plane data lines includes acquiring a preset voltage signal having a same polarity as data signals of the first row of the next frame, and transmitting the preset voltage signal to the in-plane data lines.

In this solution, when we acquire the polarity of data signals of the first row of the next frame, we can set the preset voltage signal to have a same polarity as the data signals of the first row of the next frame. For example, when the polarity of data signals of the last row of the current frame is opposite to polarity of data signals of the first row of the next frame, we input, during the V-black time, the in-plane data lines in advance a preset voltage signal having a same polarity as the data signals of the first row of the next frame; in this way, the voltage level of the data lines and the voltage level of data signals of the first row of the next frame will have the same polarity, and thus, a corresponding voltage level may be reached quickly in the period of scanning the first row of the next frame to ensure the charging rate at the initial stage of the scanning to be relatively high, so that a relatively high charging voltage can be achieved and the problem that pixels of the first row of the next frame are dark can be reduced or even eliminated.

In an embodiment, a polarity of data signals of the last row of the current frame is opposite to polarity of data signals of the first row of the next frame; and the step of acquiring a preset voltage signal having a same polarity as data signals of a first row of a next frame includes: detecting and basing a polarity of data signals of the last row of the current frame to acquire a preset voltage signal having a polarity opposite to polarity of data signals of the last row of the current frame.

In this solution, we set the circuit architecture as that: regarding the same data lines, the data signals of the last row of the current frame have a polarity opposite to the polarity of data signals of the first row of the next frame, so that we can acquire the polarity of the data signals of the first row of the next frame without the need to acquire the data signals of the first row of the next frame, and the polarity of the data signals of the first row of the next frame can be indirectly acquired by acquiring the polarity of the data signals of the last row of the current frame, and thus, we can set the preset voltage signal to have a same polarity as the data signals of the first row of the next frame. For example, when the data signals of the last row of the current frame are of 7 Volts and the data signals of the first row of the next frame are of −7 Volts, we input, during the V-black time, the in-plane data lines in advance a preset voltage signal having a negative polarity (such as, −1 Volts, −3 Volts or the like; where the absolute value of the voltage of the preset voltage signals does not exceed the voltage of data signals corresponding to 255 gray-scale of the panel design); in this way, the voltage level of the data lines and the voltage level of the first row of the next frame will have the same polarity, and thus, a corresponding voltage level may be reached quickly in the period of scanning the first row of the next frame to ensure the charging rate at the initial stage of the scanning to be relatively high, so that a relatively high charging voltage can be achieved and the problem that pixels of the first row of the next frame are dark can be reduced or even eliminated if there is no other influence.

In an embodiment, the step of acquiring a preset voltage signal having a same polarity as data signals of a first row of a next frame includes: acquiring data signals of the first row of the next frame from a timing controller IC (TCON IC) 120 after scan of scanning lines of the last row of the current frame is completed and before scanning lines of the first row of the next frame are started; and detecting and basing a polarity of data signals of the first row of the next frame to acquire a preset voltage signal having a same polarity as data signals of the first row of the next frame.

Figure 5:
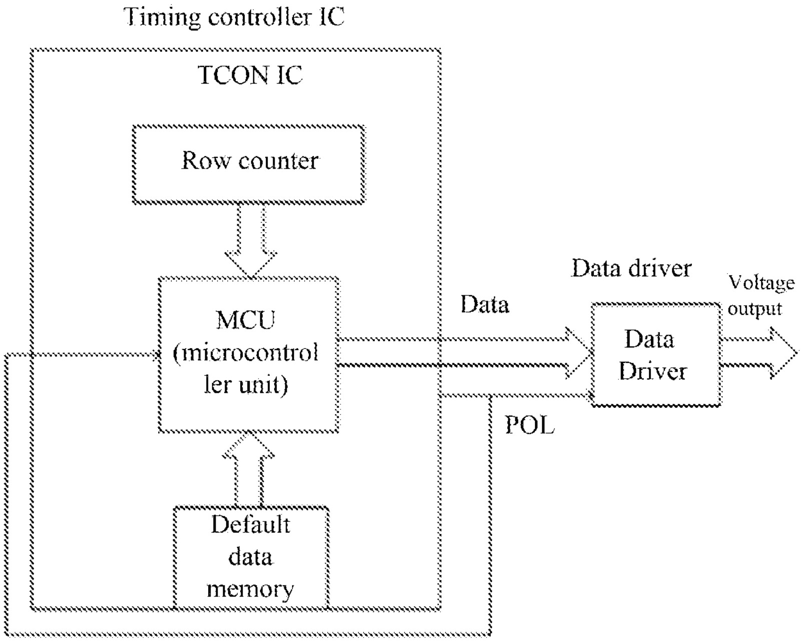
FIG. 5 is a schematic diagram of a timing controller IC (TCON IC) according to an embodiment of the present application.

In this solution, as shown in FIG. 5, an advance acquirer 160 is provided to detect the polarity of data signals of the first row of the next frame from the timing controller IC (TCON IC) 120 when the data signals of the next frame has not been transmitted to the plane, so that regardless of the architecture of the display panel 110, we can disregard the polarity or voltage level of the data signals of the current frame, and as long as the polarity of data signals of the first row of the next frame is acquired from the timing controller IC (TCON IC) 120, a preset voltage signal having the same polarity as data signals of the first row of the next frame can be input in advance to the in-plane data lines during the V-blank time to ensure that the charging rate at the initial stage of the scanning is relatively high, so that a relatively high charging voltage can be achieved and the problem that pixels of the first row of the next frame are dark can be reduced or even eliminated. Furthermore, under the condition of merely acquiring the polarity of data signals of the first row of the next frame, we only need to design less voltage conversion for the preset voltage signal. For example, if the voltage of the data signals corresponding to 255 grayscale is ±7 volts, we can design the preset voltage signal to be 3.5 volts or −3.5 volts, and if necessary, one more 0 volt can be designed (for example, if the data signals of the first row of the next frame is 0 volt, the preset voltage signal can be set as 0 volt, that is, the polarity corresponding to the 0 volt is the same 0 volt), so that pressurization operation can be performed separately when the data signals of the first row of the next frame is of a positive polarity, negative polarity and 0 volt, and the design is simple.

In an embodiment, the step of acquiring a preset voltage signal having a same polarity as data signals of a first row of a next frame includes: acquiring data signals of the first row of the next frame from a timing controller IC (TCON IC) 120 after scan of scanning lines of the last row of the current frame is completed and before scanning lines of the first row of the next frame are started; and detecting and basing data signals of the first row of the next frame to acquire a preset voltage signal having same polarity data with data signals of the first row of the next frame.

In this solution, an advance acquirer 160 is provided to detect the polarity of data signals of the first row of the next frame from the timing controller IC (TCON IC) 120 when the data signals of the next frame has not been transmitted to the plane, so that regardless of the architecture of the display panel 110, we can disregard the polarity or voltage level of the data signals of the current frame, and as long as the polarity of data signals of the first row of the next frame is acquired from the timing controller IC (TCON IC) 120, a preset voltage signal having the same polarity as data signals of the first row of the next frame can be input in advance to the in-plane data lines during the V-blank time. In this way, the voltage level within the data lines and that of data signals of the first row of the next frame will be the same, so that a desired voltage level will be reached as starting the scan of the first row of the next frame, and the charging rate during the entire scanning can be kept at the level of the corresponding data signals, which enables the display panel 110 to finally achieve a higher charging voltage or even achieve the preset charging voltage, and reduces or even eliminates the problem that pixels of the first row of the next frame are dark.

In an embodiment, a polarity of data signals of the last row of the current frame is opposite to polarity of data signals of the first row of the next frame; and a voltage of the preset voltage signal is zero volts in the step of transmitting a preset voltage signal to in-plane data lines.

In this solution, regardless of whether the polarity of the last row of the current frame and that of the first row of the next frame are the same, the voltage of the in-plane data lines is now adjusted to a voltage level of 0 volt, that is, regardless of the data signals of the first row of the next frame, the preset voltage signal is set to 0 volt. In such a design, we can ensure that the voltage of the in-plane data lines does not differ too much from the voltage level of data lines of the first row of the next frame. For example, if the polarity voltage of the last row of the current frame is 5 volts, and the polarity voltage of the first row of the next frame is 10 volts, we adjust in advance the voltage of the in-plane data lines to 0 volt; and in particular, when the last row of the current frame has a polarity opposite to polarity of the first row of the next frame, if the voltage of the in-plane data lines is adjusted in advance to a voltage level of 0 volt, the voltage level difference between the voltage of the in-plane data lines and the data signals of the first row of the next frame is more obvious than the voltage level difference between the voltage of the in-plane data lines and the data signals of the first row of the next frame if the voltage of the in-plane data lines is not adjusted in advance to a voltage level of 0 volt, which may better lessen the cross voltage and ensure the charging rate at the initial stage of the scanning to be relatively high, so that the display panel 110 finally achieves a high charging voltage, and the influence of the cross-voltage problem on the pixel brightness is reduced or even eliminated.

In an embodiment, the step of detecting and basing a polarity of data signals of a last row of the current frame includes: a counter beginning to count a scanning row number when the timing controller IC (TCON IC) 120 detects that a polarity inversion signal for a source driver (POL) is switched to the current frame; and detecting and serving a polarity of data signals of a current scanning row as a polarity of data signals of the last row when a current scanning row number is equal to a preset maximum row number.

Figure 4:
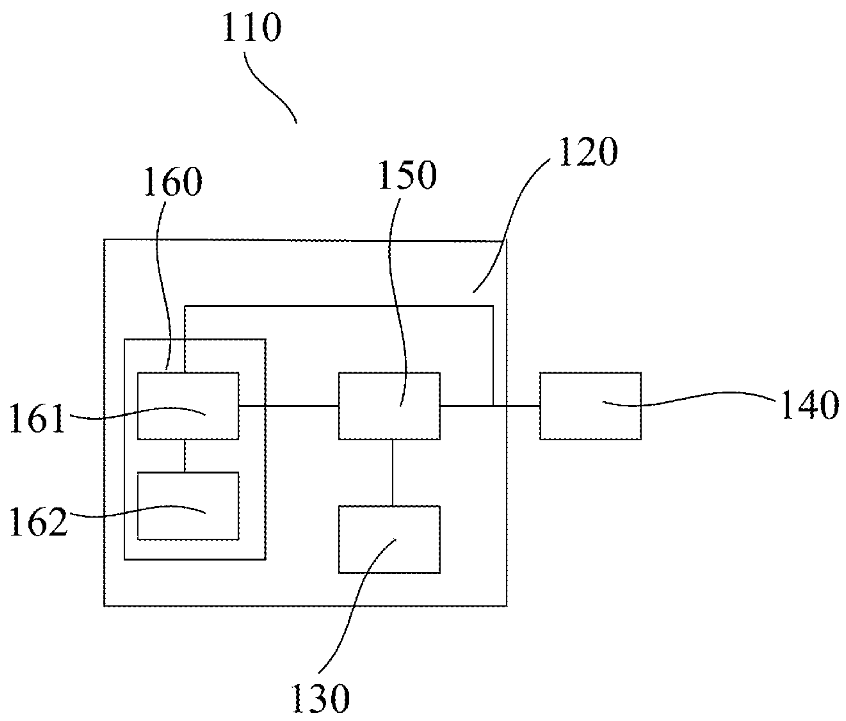
FIG. 4 is a schematic diagram of a display panel according to an embodiment of the present application.

In this solution, as shown in FIG. 4, we adds a counter here to count when the last row of the current frame is reached and when the V-blank is reached. The polarity inversion signals are switched during the V-black time; firstly, the timing controller IC (TCON IC) 120 is used to detect switching of the polarity inversion signal, and then, when the switching of the polarity inversion signal is detected, the value of a row counter 162 is detected to calculate which row the current data is transferred to, as long as it is completed before output of the first row. The timing controller IC (TCON IC) 120 can determine whether to output the preset voltage signals or not based on the value of the row counter 162. For example, the total number of rows of the display panel 110 having a full high definition (FHD) resolution nowadays may reach 1125 considering the V-blank time; thus, when the timing controller IC (TCON IC) 120 detects that it is currently the 1125*th* row, it considers that the transmission has been performed to the last row, and at this time, the preset voltage signal in a default memory 130 (which may be a data signal memory) is taken out for output; the output is converted into an actual voltage output via a data driver chip 140, and the voltage of in-plane transmission lines is changed to the same polarity in advance (in a case where gate lines are kept at a close state) before the output of the first row of the next frame to complete the cross voltage compensation process. Where the preset voltage signal in the default memory can take value from data of the black screen, or take a more appropriate value based on the actual voltage signal of the first row of the next frame.

As shown in FIG. 4, another embodiment of the present application discloses a display panel 110, including: a timing controller IC (TCON IC) 120, controlling a gate driver circuit and a source driver circuit; a pre-compensation circuit 150, outputting a preset voltage signal; a default memory 130 (also known as a default data memory), storing the preset voltage signal; and a data driver chip 140, transmitting data signals to data lines within a display panel 110; where after scan of a last row of a current frame is completed and before scan of a first row of a next frame is started, the timing controller IC (TCON IC) 120 inputs the preset voltage signal to data lines within the display panel 110 while keeping the gate driver circuit closed.

In this solution, the polarity inversion signal outputted from the timing controller IC (TCON IC) 120 to the source driver of the data driver chip 140 is pulled back for detection, and the polarity inversion signal for the source driver controls the positive and negative polarity of the output voltage of the data driver chip 140. The pre-compensation circuit 150 determines the preset voltage signal according to the polarity inversion signal for the source driver and the timing controller IC (TCON IC) 120, and the timing controller IC (TCON IC) 120, during the V-black time, inputs the preset voltage signal to data lines of the display panel 110 while keeping the gate driver circuit closed. As shown in FIG. 2, when a pre-frame is switched to the first row of the next frame for charging, the switching between the positive and negative polarities will cause the voltage on the data lines to switch from a level a. If the voltage difference between voltages of data signals of the last row of the current frame and voltages of data signals of the first row of the next frame is large, and even when the polarities thereof are opposite, data voltage of the data signals will fail to quickly reach a preset data voltage at the initial stage of scanning the first row of the next frame. For example, as shown in FIG. 2, the voltage difference between the level a and a level b is great, so the final charging voltage can only reach the position of b', and there is a gap of ΔV to the target b, which may lead to an insufficient charging rate at the initial stage of the scanning, and then causes occurrences of problems that the final charging voltage is insufficient and the first row of the next frame is not bright enough. In this solution, all the scanning lines are kept at a close state after scan of scanning lines of the last row of the current frame is completed and before scanning lines of the first row of the next frame are started, that is, V-blank time. And during the V-black time, the preset voltage signal is transmitted to the in-plane data lines to change the voltage therein in advance, so that in the period of scanning the last row of the current frame and the first row of the next frame, it is possible to reduce or even avoid the problem that the cross voltage of the data lines during the time of scanning the two rows of scanning lines is too large, which thereby solves the cross-voltage problem between the last row of the current frame and the first row of the next frame, especially the problem of insufficient charging caused by cross-voltage switching of different polarities. The effect as shown in FIG. 3 can be achieved. FIG. 3 is a schematic diagram of this solution. After the POL switches during the V-blank time, the preset voltage signal is transmitted in the last row of the current frame. This effect takes example by setting the default preset voltage signal as the black screen data. The voltage level will be slowly switched from the level a to 0 via a solid black line, and then when the first row of the next frame starts output, switching of the voltage can be started from the level 0 to the level b since the voltage level is reduced to 0 from a in advance; thus, it is easier to reach in the same charging time, and thereby ensure the charging effect of the first row.

In an embodiment, the pre-compensation circuit 150 includes an advance acquirer 160, and the advance acquirer 160 includes a microcontroller unit (MCU) 161 and a row counter 162. The microcontroller unit (MCU) 161 and the row counter 162 are disposed on the timing controller IC (TCON IC) 120, and the advance acquirer 160 acquires data signals of the first row of the next frame from the timing controller IC (TCON IC) 120.

In this solution, the advance acquirer 160 detects data signals of the first row of the next frame in advance from the timing controller IC (TCON IC) 120 when the data signals of the next frame has not been transmitted to the plane. Since the POL signals will be switched during the V-blank time, the MCU (microcontroller unit 161) is firstly used to detect the switching of the POL, and when the POL is detected to be switched, the row counter 162 detects the value of the row counter 162 to calculate which line the current data is transmitted to. As long as the cross voltage compensation is completed before the output of the first row, the TCON IC will determine whether to output the preset voltage signal or not based on the value of the row counter 162, so that regardless of the architecture of the display panel 110, we can disregard the polarity or voltage level of the data signals of the current frame, and as long as the polarity of data signals of the first row of the next frame is acquired from the timing controller IC (TCON IC) 120, a preset voltage signal having the same polarity as data signals of the first row of the next frame can be input in advance to the in-plane data lines during the V-blank time to ensure that the charging rate at the initial stage of the scanning is relatively high, so that a relatively high charging voltage can be achieved and the problem that pixels of the first row of the next frame are dark can be reduced or even eliminated.

Figure 6:
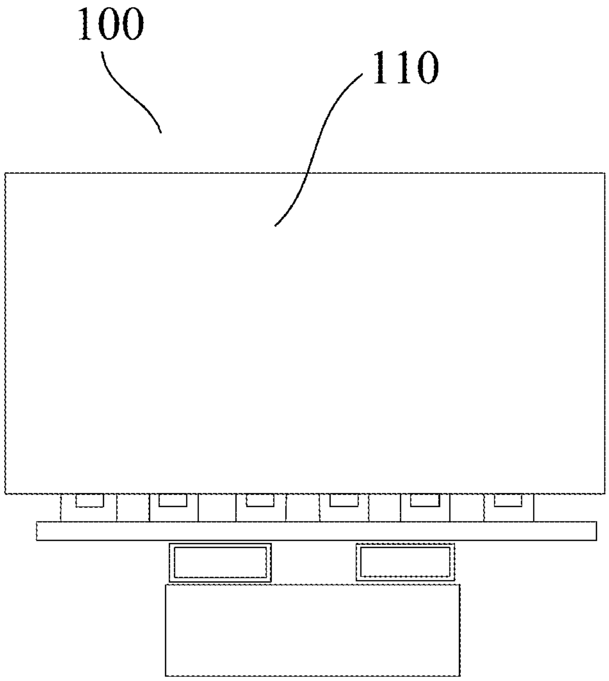
FIG. 6 is a schematic diagram of a display device according to an embodiment of the present application.

As shown in FIG. 6, another embodiment of the present application discloses a display device 100 that includes a display panel 110 described above.

It should be understood that the definition to respective steps related in this solution cannot be deemed as definition to the sequence of the steps without influencing implementation of the specific embodiment. Steps presented in the previous can be executed previously or posteriorly or even simultaneously, and as long as this solution can be implemented, it shall fall within the protection scope of the present application.

The panel of the present application can be a twisted nematic panel, an in-plane switching panel, and a multi-domain vertical alignment panel. Certainly, the panel can be other types of panels, as long as it is applicable.

The foregoing is an optional detailed description of the present application with reference to specific optional embodiments, and it should not be considered that the specific implementation of the present application is not limited to the description. A person of ordinary skill in the art of the present application may further make several simple deductions or substitutions without departing from the concept of the present application, and the deductions or substitutions shall fall within the protection scope of the present application.

What is claimed is:

1. A cross voltage compensation method for a display panel, comprising:

transmitting a preset voltage signal to in-plane data lines after scanning of a scanning line of a last row of a current frame is completed and before scanning of a scanning line of a first row of a next frame is started; and keeping all the scanning lines at a closed state while transmitting the preset voltage signal to the in-plane data lines;

wherein transmitting a preset voltage signal to in-plane data lines comprises:

acquiring a preset voltage signal having a same polarity as data signals of a first row of a next frame; and transmitting the preset voltage signal having the same polarity as data signals of the first row of the next frame to the in-plane data lines;

wherein the acquiring a preset voltage signal having a same polarity as data signals of a first row of a next frame comprises:

acquiring data signals of the first row of the next frame from a timing controller IC after the scanning of the scanning line of the last row of the current frame is completed and before the scanning of the scanning line of the first row of the next frame is started; and detecting and basing the data signals of the first row of the next frame to acquire the preset voltage signal having the same polarity as the data signals of the first row of the next frame.

2. The cross voltage compensation method for a display panel according to claim 1, wherein the preset voltage signal takes a more appropriate value according to an actual voltage signal of the first row of the next frame.

3. The cross voltage compensation method according to claim 1, wherein the preset voltage signal is stored in a data signal memory.

4. The cross voltage compensation method according to claim 1, wherein the close state of scanning lines is enabled and maintained by controlling a gate driver circuit.

5. The cross voltage compensation method for a display panel according to claim 1, wherein an absolute voltage value of the preset voltage signal does not exceed a voltage of data signal corresponding to 255 grayscale of the display panel.

6. The cross voltage compensation method according to claim 1, wherein the preset voltage signal has a voltage magnitude that is a half of a voltage magnitude of a data signal corresponding to 255 grayscale of the display panel.

* * * * *